(12) United States Patent
Chern et al.

(10) Patent No.: US 9,367,193 B2
(45) Date of Patent: Jun. 14, 2016

(54) MULTI-TOUCH PAD

(71) Applicant: UNEO INC., Taipei (TW)

(72) Inventors: Yann-Cherng Chern, Taipei (TW); Chih-Sheng Hou, Taipei (TW)

(73) Assignee: UNEO INC., Tapei (TW)

( * ) Notice: Subject to any disclaimer, the term of this patent is extended or adjusted under 35 U.S.C. 154(b) by 25 days.

(21) Appl. No.: 14/330,588

(22) Filed: Jul. 14, 2014

(65) Prior Publication Data

US 2016/0011701 A1  Jan. 14, 2016

(51) Int. Cl.
| | |
|---|---|
| G06F 3/045 | (2006.01) |
| B29C 65/00 | (2006.01) |
| B32B 37/00 | (2006.01) |
| B32B 38/14 | (2006.01) |
| B05D 5/12 | (2006.01) |
| G01D 5/16 | (2006.01) |
| G06F 3/041 | (2006.01) |

(52) U.S. Cl.
CPC *G06F 3/045* (2013.01); *G01D 5/16* (2013.01); *G06F 3/0412* (2013.01); *G06F 3/0414* (2013.01); *G06F 3/0416* (2013.01); *G06F 2203/04103* (2013.01); *G06F 2203/04104* (2013.01); *G06F 2203/04106* (2013.01)

(58) Field of Classification Search
CPC ............ G06F 3/045; G06F 3/0412; G06F 2203/04106; G06F 3/0416; G06F 2203/04103; G01D 5/16
See application file for complete search history.

(56) References Cited

U.S. PATENT DOCUMENTS

2009/0256817 A1* 10/2009 Perlin ............... G06F 3/0233
                                                        345/174

* cited by examiner

*Primary Examiner* — Charles Hicks
(74) *Attorney, Agent, or Firm* — Hauptman Ham, LLP

(57) ABSTRACT

A multi-touch pad having grid piezoresistor structure is disclosed. The grid structure conducts current to flow more linearly thereby allowing a more precise calculation of touch position.

20 Claims, 20 Drawing Sheets

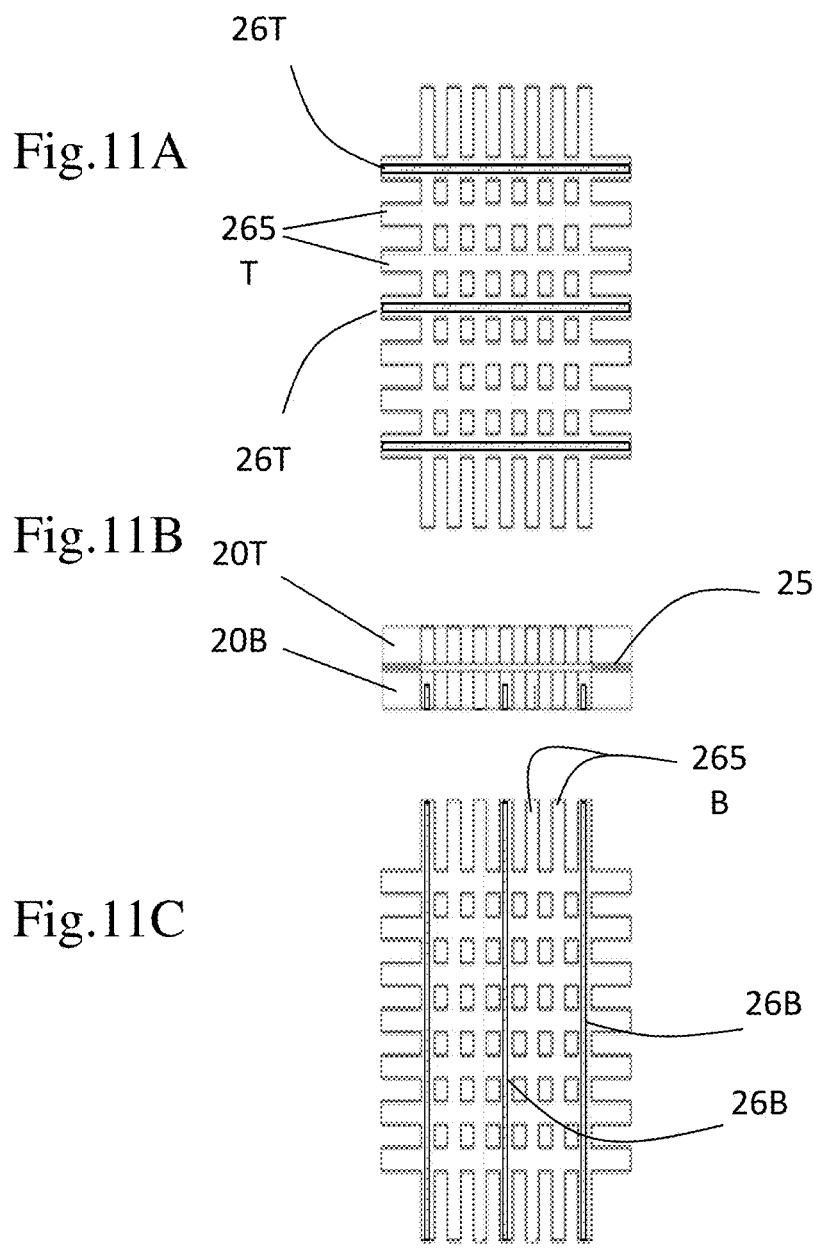

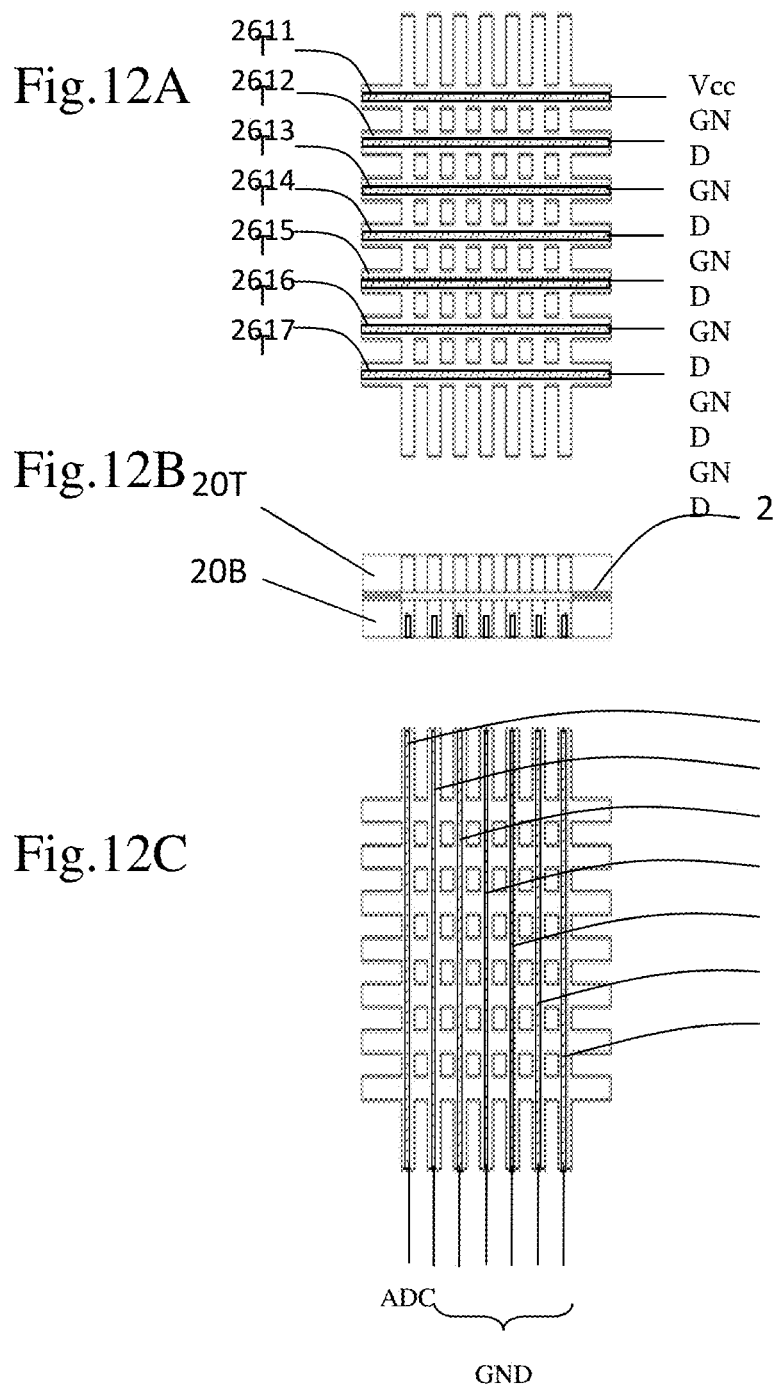

MULTI-TOUCH PAD

BACKGROUND

1. Technical Field

The present invention relates to a multi-touch pad, especially related to a multi-touch pad having grid piezoresistor structure. The grid structure conducts current to flow more linearly from power end to ground end.

2. Description of Related Art

FIGS. 1~3 show a prior art.

FIG. 1 shows a prior art multi-touch pad 14 which is disclosed in US20090256817. The multi-touch pad 14 is used by a user's finger to input instructions to a computer 12. A monitor 10 is electrically coupled to the computer 12 for displaying information. The multi-touch pad 14 has a top layer 18.

FIG. 2 shows a section view of the input device 14. Under the top cover 18, there is a stack of top electrode wires 14T, top resistor 15T, force sensing resistor 16, bottom resistor 15B, and bottom electrode wires 14B.

FIG. 3 shows a current pattern for the structure of FIG. 2.

FIG. 3 shows that a spot P is depressed as an example. Current 17 flows from a top wire 14T to a bottom wire 14B. Current 17 fans in, as shown in area 17T, to the spot P from the top wire 14T, and the current 17 fans out, as shown in area 17B, to the bottom wire 14B.

Since the resistance for the current fan in area and fan out area of the force sensing resistor at different pressed position equivalents to a resistance of a plurality of paralleled connected circuit path. The current is nonlinearity at different pressed position between the two electrodes. The current nonlinearity leads to a deviation of the pressed position calculation; the nearer the position is to the electrode, the larger the deviation is. For a touch pad structure, a current linearity is desirable so that the deviation of pressed position calculation can be reduced or eliminated.

BRIEF DESCRIPTION OF THE DRAWINGS

FIGS. 10 and 11A~11C show a third embodiment according to the present invention.

FIGS. 12A~12C show a first electrical connection according to the present invention.

DETAILED DESCRIPTION OF THE INVENTION

The present invention discloses a multi-touch pad with grid piezoresistor; the grid piezoresistor conducts current more linearly from top electrode to bottom electrode when the multi-touch pad is depressed. The grid piezoresistor structure also saves piezoresistor material a lot due to the holes enclosed in the grid piezoresistor.

The size of the hole dependents on the tool to be used. For a first example, the size for the hole is designed to be as small as 3 mm square or in diameter for a multi-touch pan with human being's finger to touch, where a human being's finger is deemed roughly to have a touch area around 5 mm square or in diameter. For a second example, the size of the hole is designed as small as 0.2~0.4 mm square or in diameter for a multi-touch pan with a stylus to touch, where a tip of a stylus is deemed to have a touch area roughly around 0.5 mm in diameter.

The grid piezoresistor structure leads the current to be linearity at different pressed position between the two electrodes. The current linearity at different pressed position leads to the position calculation more correct.

FIGS. 4 and 5A~5C show a first embodiment according to the present invention.

Figure 1:
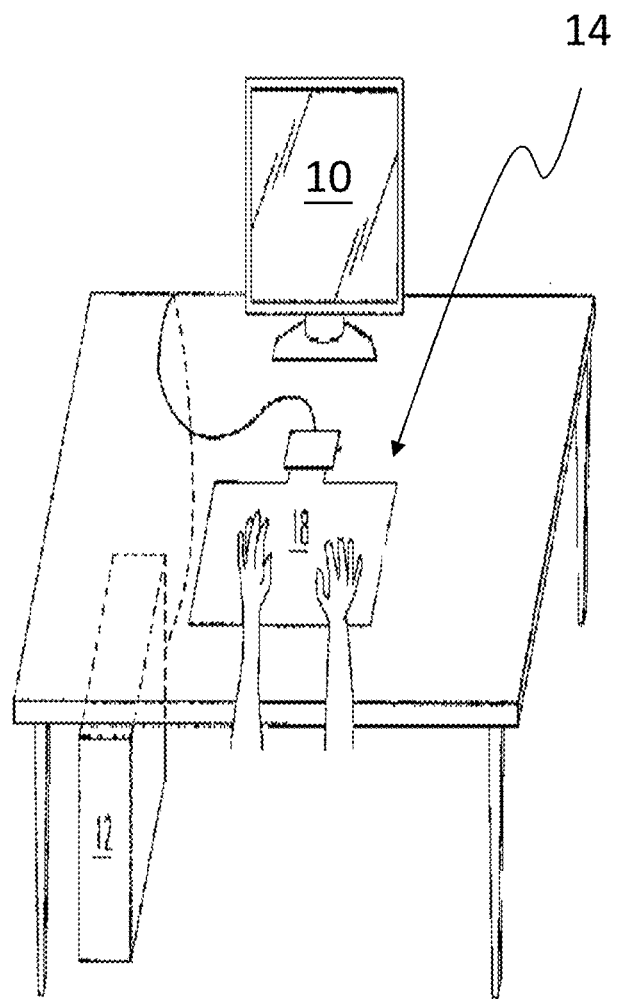
FIGS. 1~3 show a prior art.
Figure 2:
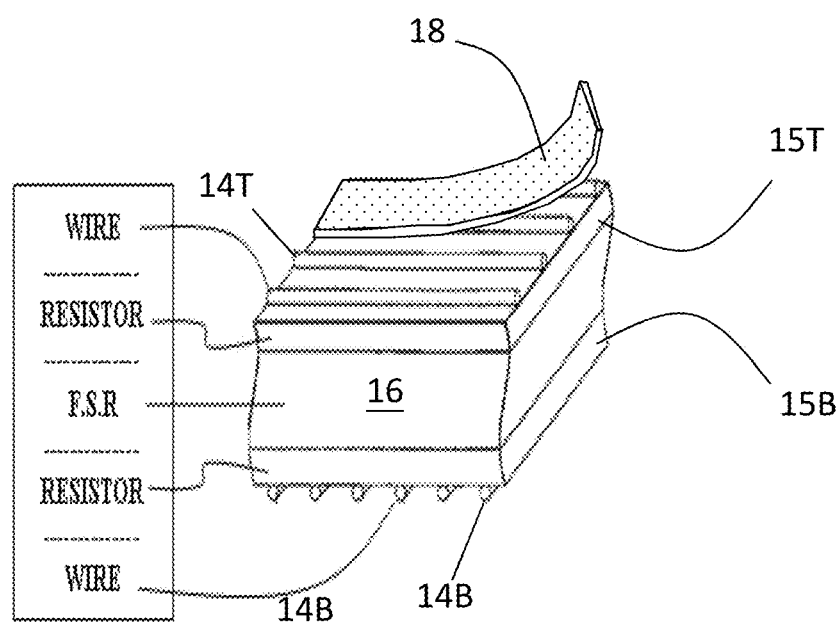
Figure 3:
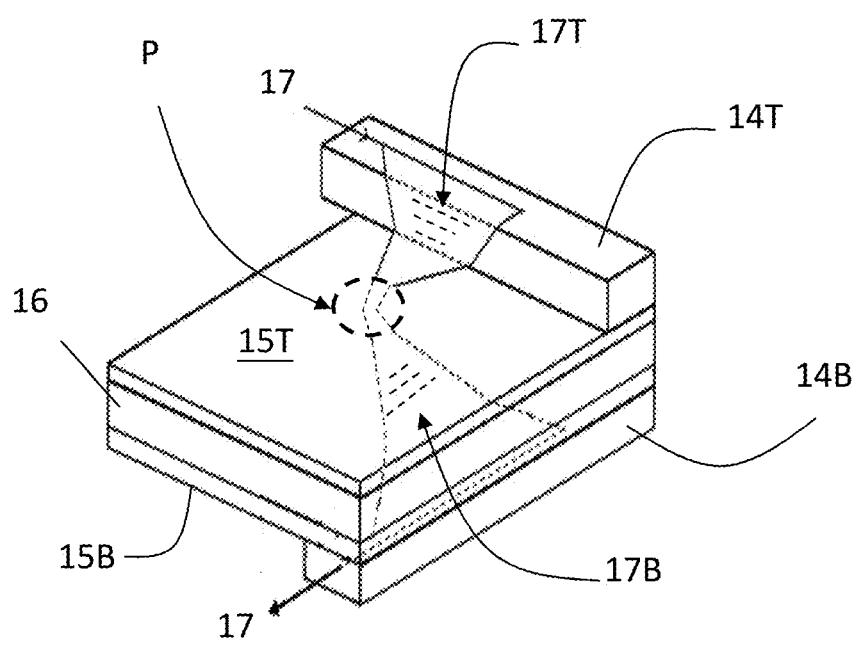
Figure 4:
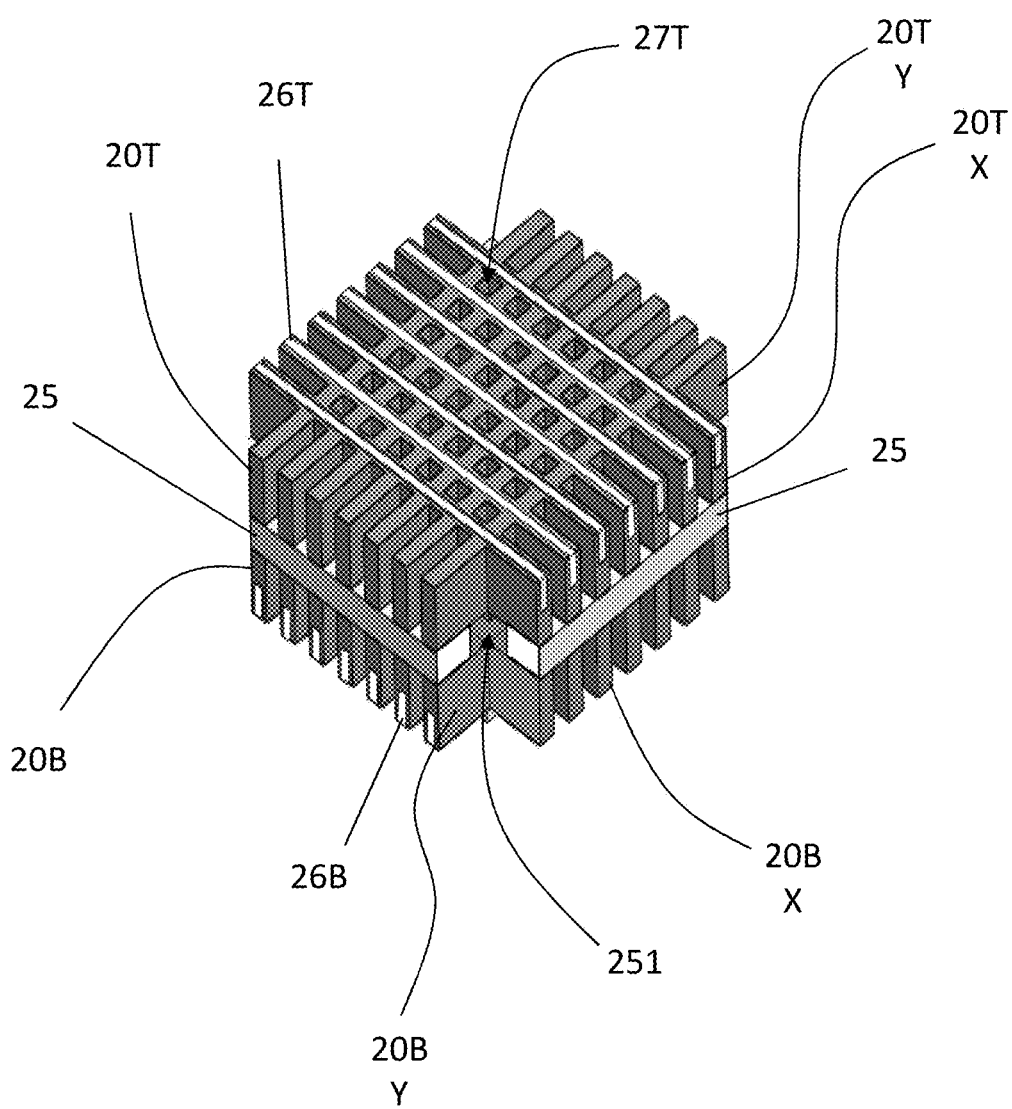
FIGS. 4 and 5A~5C show a first embodiment according to the present invention.

FIG. 4 shows an isometric view of the first embodiment.

FIG. 4 shows a Multi-touch pad which has a top grid piezoresistor 20T and a bottom grid piezoresistor 20B with a spacer 25 sandwiched in between the top grid piezoresistor 20T and the bottom grid piezoresistor 20B. The top grid piezoresistor 20T has a plurality of hole 27T passing through. The bottom grid piezoresistor 20B has a plurality of hole 27B passing through.

The top grid piezoresistor 20T has a plurality of latitudinal piezoresistor strip 20TX and a plurality of longitudinal piezoresistor strip 20TY. The latitudinal piezoresistor strips 20TX and the longitudinal piezoresistor strips 20TY are interwoven to be coplanar on top side and coplanar on bottom side.

The bottom grid piezoresistor 20B has a plurality of latitudinal piezoresistor strip 20BX and a plurality of longitudinal piezoresistor strip 20BY. The latitudinal piezoresistor strips 20BX and the longitudinal piezoresistor strips 20BY are interwoven to be coplanar on top side and coplanar on bottom side.

A spacer 25 is configured in between the top grid piezoresistor 20T and the bottom grid piezoresistor 20B for maintaining a predetermined space 251 between the two grid piezoresistor.

At least a first latitudinal electrode 26T is configured on a top of a first latitudinal piezoresistor 20TX of the top grid piezoresistor 20T. At least a second latitudinal electrode 26T is configured on a top of a second latitudinal piezoresistor 20TX of the top grid piezoresistor 20T.

At least a first longitudinal electrode 26B is configured on a bottom of a first longitudinal piezoresistor 20BY of the bottom grid piezoresistor 20B. At least a second longitudinal electrode 26B is configured on a bottom of a second longitudinal piezoresistor 20BY of the bottom grid piezoresistor 20B.

Figure 5A:
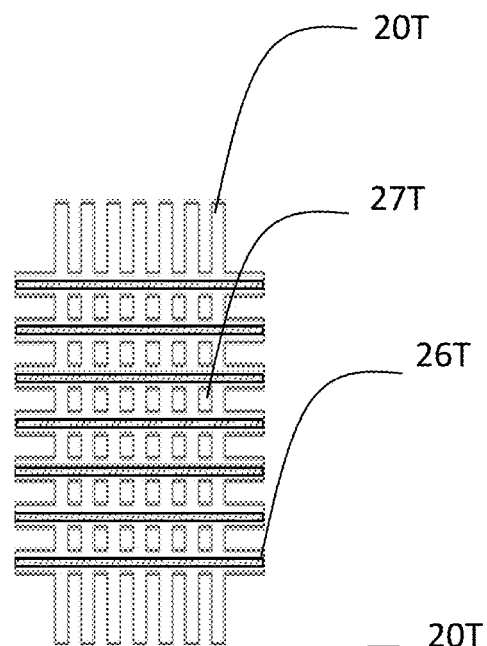

FIG. 5A shows a top view of the first embodiment.

FIG. 5A shows that the top grid piezoresistor 20T has a plurality of latitudinal electrode 26T. A first latitudinal electrode 26T is configured on a top of a first latitudinal piezoresistor 20TX. A second latitudinal electrode 26T is configured on a top of a second latitudinal piezoresistor 20TX. Wherein the first latitudinal electrode is next to the second latitudinal electrode.

Figure 5B:
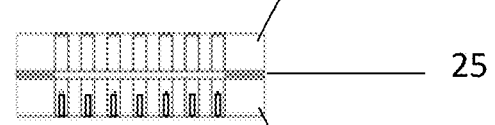

FIG. 5B shows an elevation view of the first embodiment. A spacer 25 is configured in between the top grid piezoresistor 20T and the bottom grid piezoresistor 20B.

Figure 5C:
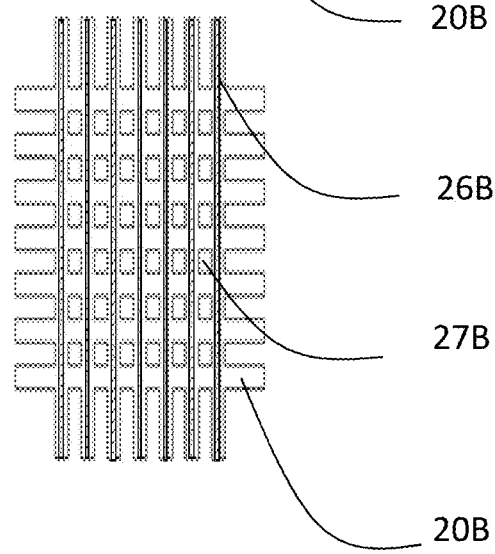

FIG. 5C shows a bottom view of the first embodiment.

FIG. 5C shows that the bottom grid piezoresistor 20B has a plurality of hole 27B. At least a first longitudinal electrode 26B is configured on a bottom of a first longitudinal piezoresistor 20BY. At least a second longitudinal electrode 26B is configured on a bottom of a second longitudinal piezoresistor 20BY. The first longitudinal electrode is next to the second longitudinal electrode.

FIGS. 6 and 7A~7C show a second embodiment according to the present invention.

Figure 6:
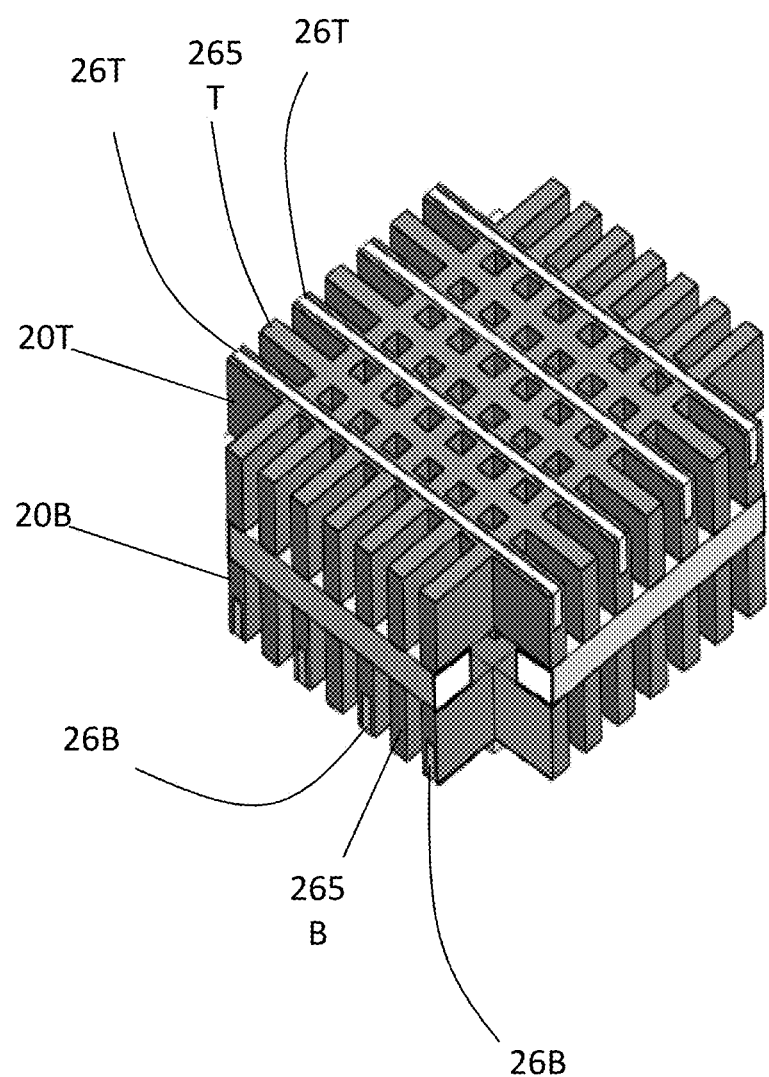
FIGS. 6 and 7A~7C show a second embodiment according to the present invention.

FIG. 6 shows an isometric view of the second embodiment.

As compared to the first embodiment of FIG. 4, the difference is that the second embodiment of FIG. 6 has a wider distance between neighboring latitudinal electrodes 26T. A latitudinal piezoresistor strip 265T is located in between neighboring latitudinal electrodes 26T. For the bottom grid piezoresistor 20B, the second embodiment of FIG. 6 also has a wider distance between neighboring longitudinal electrodes 26B, a longitudinal piezoresistor strip 265B is located in between neighboring longitudinal electrodes 26B.

Figure 7A:
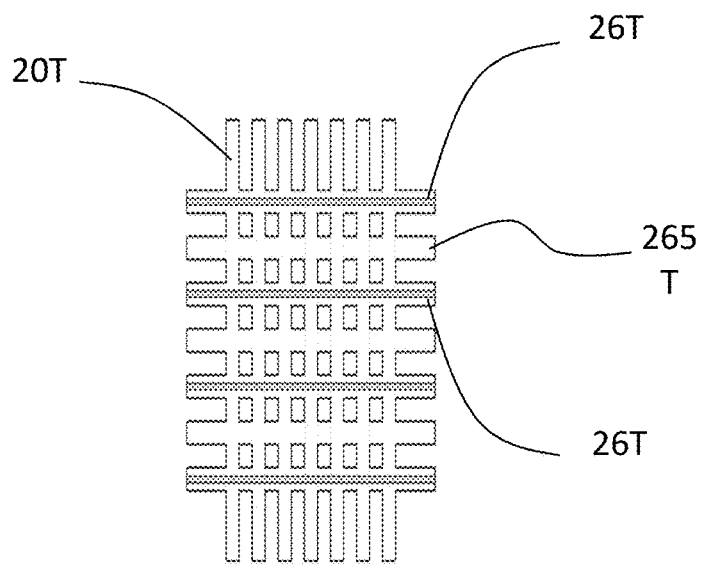

FIG. 7A shows a top view of the second embodiment.

FIG. 7A shows that the top grid piezoresistor 20T has a plurality of latitudinal electrode 26T. A latitudinal piezoresistor strip 265T is located in between neighboring latitudinal electrodes 26T.

Figure 7B:
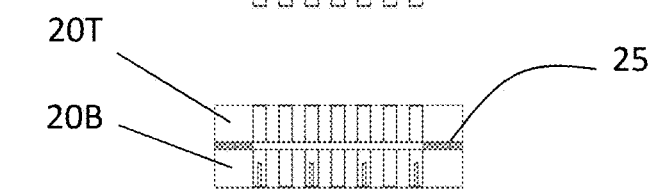

FIG. 7B shows an elevation view of the second embodiment. A spacer 25 is configured in between the top grid piezoresistor 20T and the bottom grid piezoresistor 20B.

Figure 7C:
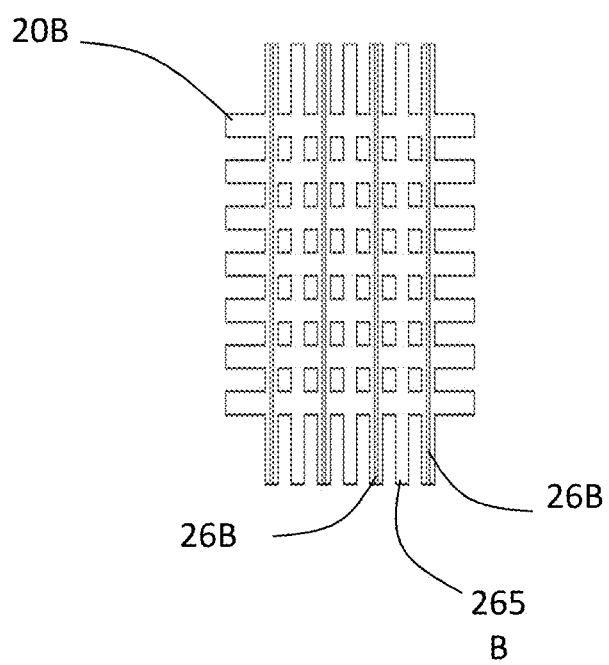

FIG. 7C shows a bottom view of the second embodiment.

FIG. 7C shows that the bottom grid piezoresistor 20B has a plurality of longitudinal electrode 26B. A longitudinal piezoresistor strip 265B is located in between neighboring longitudinal electrodes 26B.

Figure 8:
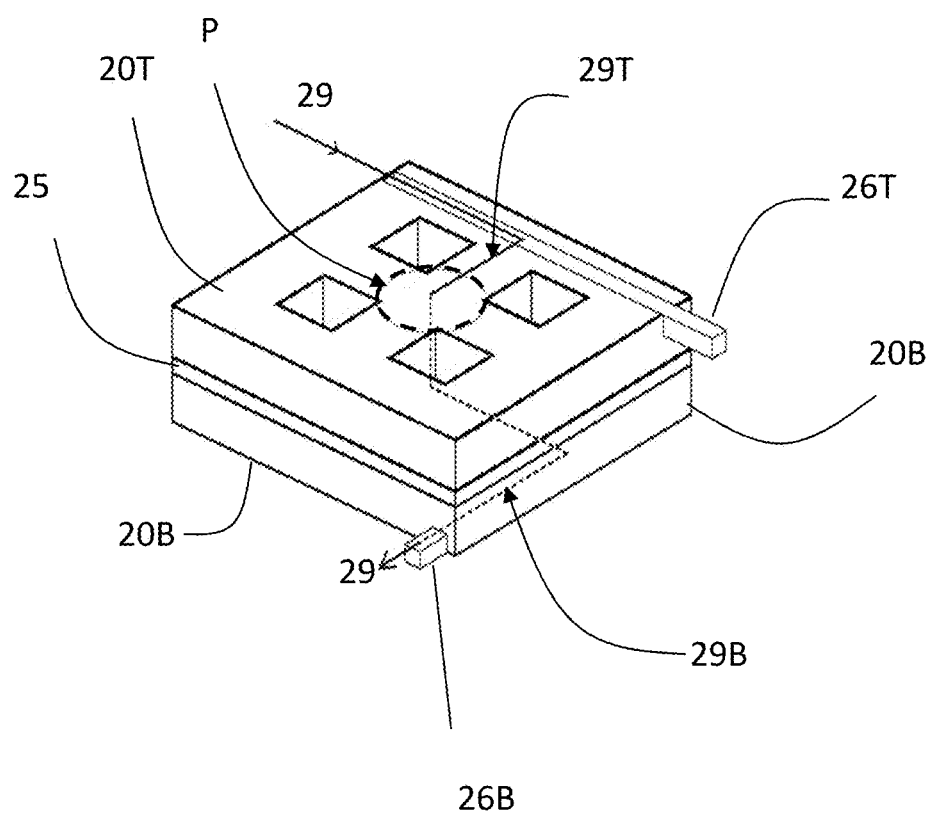
FIG. 8 shows current flow of a grid piezoresistor according to the present invention.

FIG. 8 shows current flow of a grid piezoresistor according to the present invention.

FIG. 8 shows current 29 flows in a top electrode 26T. The current flows to the depressed spot P more linearly as specified with 29T due to the narrow wall of the grid piezoresistor structure; and the current flows to the bottom electrode 26B from the depressed spot P more linearly as specified with 29B due to the narrow wall of the grid piezoresistor structure.

Figure 9:
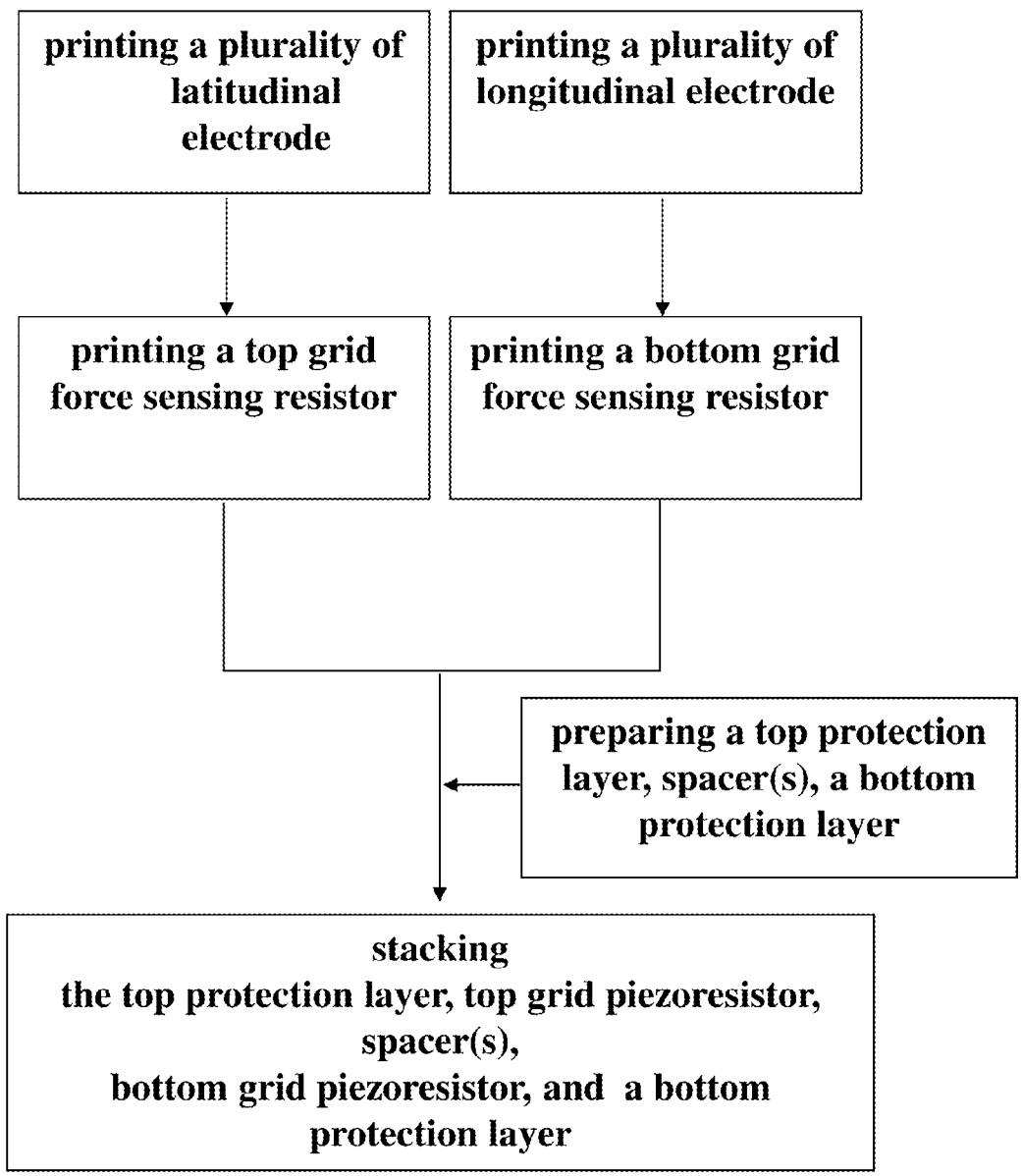
FIG. 9 shows a process for manufacturing a grid piezoresistor according to the present invention.

FIG. 9 shows a process for manufacturing a grid piezoresistor according to the present invention.

FIG. 9 shows a process for manufacturing a grid piezoresistor with silk screen printing, including the following steps:

printing a plurality of latitudinal electrode;

printing a top grid piezoresistor which has a plurality of latitudinal strip and a plurality of longitudinal strip; each latitudinal electrode is configured on a top of a corresponding one latitudinal strip;

printing a plurality of longitudinal electrode;

printing a bottom grid piezoresistor which has a plurality of latitudinal strip and a plurality of longitudinal strip; each longitudinal electrode is configured on a bottom of a corresponding one longitudinal strip;

stacking the top grid piezoresistor and the bottom grid piezoresistor with a space or slight contact in between;

a top protection layer is configured for the top grid piezoresistor to be attached on a bottom of the top protection layer;

a bottom protection layer is configured for the bottom grid piezoresistor to be attached on a top of the bottom protection layer; and a spacer is configured for maintaining a space or slight contact between the two grid piezoresistors.

FIGS. 10 and 11A~11C show a third embodiment according to the present invention.

Figure 10:
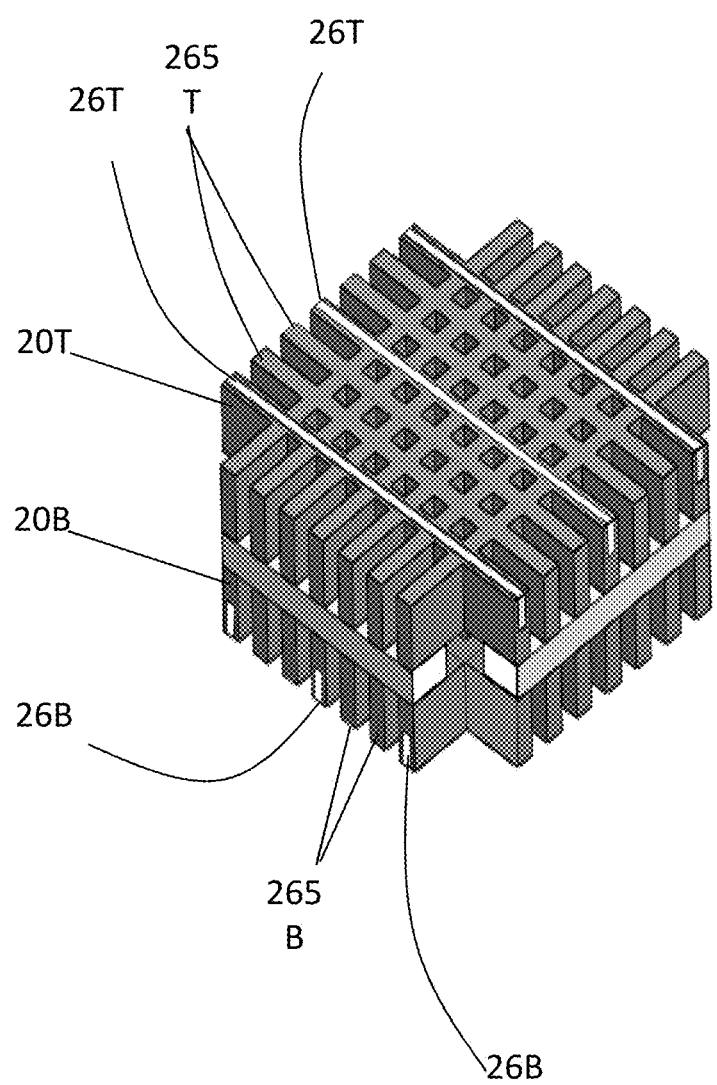

FIG. 10 shows an isometric view of the third embodiment.

As compared to the second embodiment of FIG. 6, the difference is that the third embodiment of FIG. 10 has an even wider distance between neighboring latitudinal electrodes 26T. Two latitudinal piezoresistor strips 265T are located in between neighboring latitudinal electrodes 26T as an example. For the bottom grid piezoresistor 20B, the third embodiment of FIG. 10 also has an even wider distance between neighboring longitudinal electrodes 26B, two longitudinal piezoresistor strips 265B are located in between neighboring longitudinal electrodes 26B as an example.

FIG. 11A shows a top view of the third embodiment.

FIG. 11A shows that the top grid piezoresistor 20T has a plurality of latitudinal electrode 26T. Two latitudinal piezoresistor strips 265T are located in between neighboring latitudinal electrodes 26T.

FIG. 11B shows an elevation view of the third embodiment. A spacer 25 is configured in between the top grid piezoresistor 20T and the bottom grid piezoresistor 20B.

FIG. 11C shows a bottom view of the third embodiment.

FIG. 11C shows that the bottom grid piezoresistor 20B has a plurality of longitudinal electrode 26B. Two longitudinal piezoresistor strips 265B are located in between neighboring longitudinal electrodes 26B.

FIGS. 12A~12C show a first electrical connection according to the present invention.

FIG. 12A shows that one of the latitudinal electrodes, for example, 2611T is electrically coupled to power end and the rest are electrically coupled to ground end at a single moment.

FIG. 12B shows an elevation view of the third embodiment. A spacer 25 is configured in between the top grid piezoresistor 20T and the bottom grid piezoresistor 20B.

FIG. 12C shows that one of the longitudinal electrodes, for example, 2611B is electrically coupled to ADC and the rest three electrodes 2613B, 2615B, 2017B are electrically coupled to ground end at a single moment.

Figure 13A:
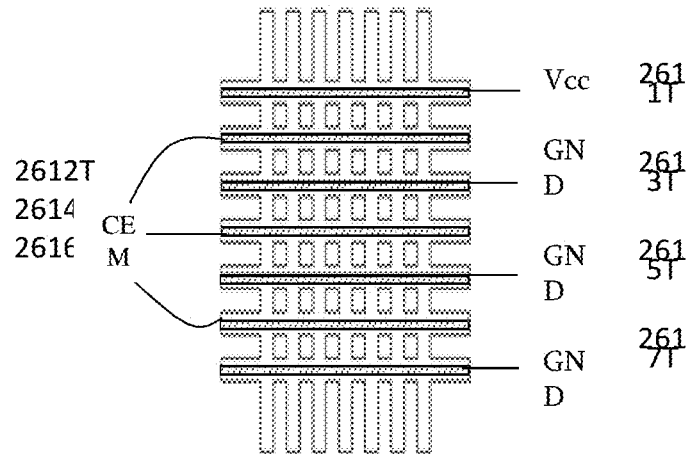
FIGS. 13A~13C show a second electrical connection according to the present invention.
Figure 13B:
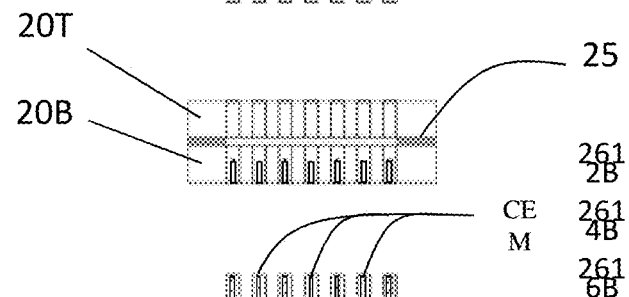
Figure 13C:
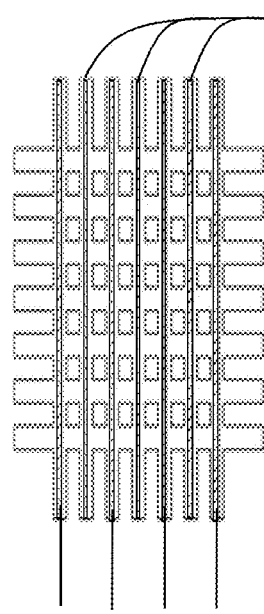

FIGS. 13A~13C show a second electrical connection according to the present invention.

FIG. 13A shows that four latitudinal electrodes 2611T, 2613T, 2615T, 2617T are alternately electrically coupled to power end; however, only one of the latitudinal electrodes, for example, 2611T is electrically coupled to power end and the rest three electrodes 2613T, 2615T, 2617T are electrically coupled to ground end at a single moment.

There are three independent metal wires 2612T, 2614T, 2616T; each is interleaved in between neighboring latitudinal electrodes 26T. The independent metal wire function as a conductivity enhancing metal (CEM) to enhance lateral conductivity between the neighboring latitudinal piezoresistor strips. The higher the lateral conductivity is, the higher the reading resolution/sensitivity is for the signal detection.

FIG. 13B shows an elevation view of the third embodiment. A spacer 25 is configured in between the top grid piezoresistor 20T and the bottom grid piezoresistor 20B.

FIG. 13C shows that four longitudinal electrodes 2611B, 2613B, 2615B, 2617B are alternately electrically coupled to ADC; however, only one of the longitudinal electrodes, for example, 2611B is electrically coupled to ADC and the rest three electrodes 2613B, 2615B, 2617B are electrically coupled to ground end at a single moment.

There are three independent metal wires 2612B, 2614B, 2616B; each is interleaved in between neighboring longitudinal electrodes 26B. The independent metal wire function as a conductivity enhancing metal (CEM) to enhance lateral conductivity between the neighboring longitudinal piezoresistor strips.

Figure 14:
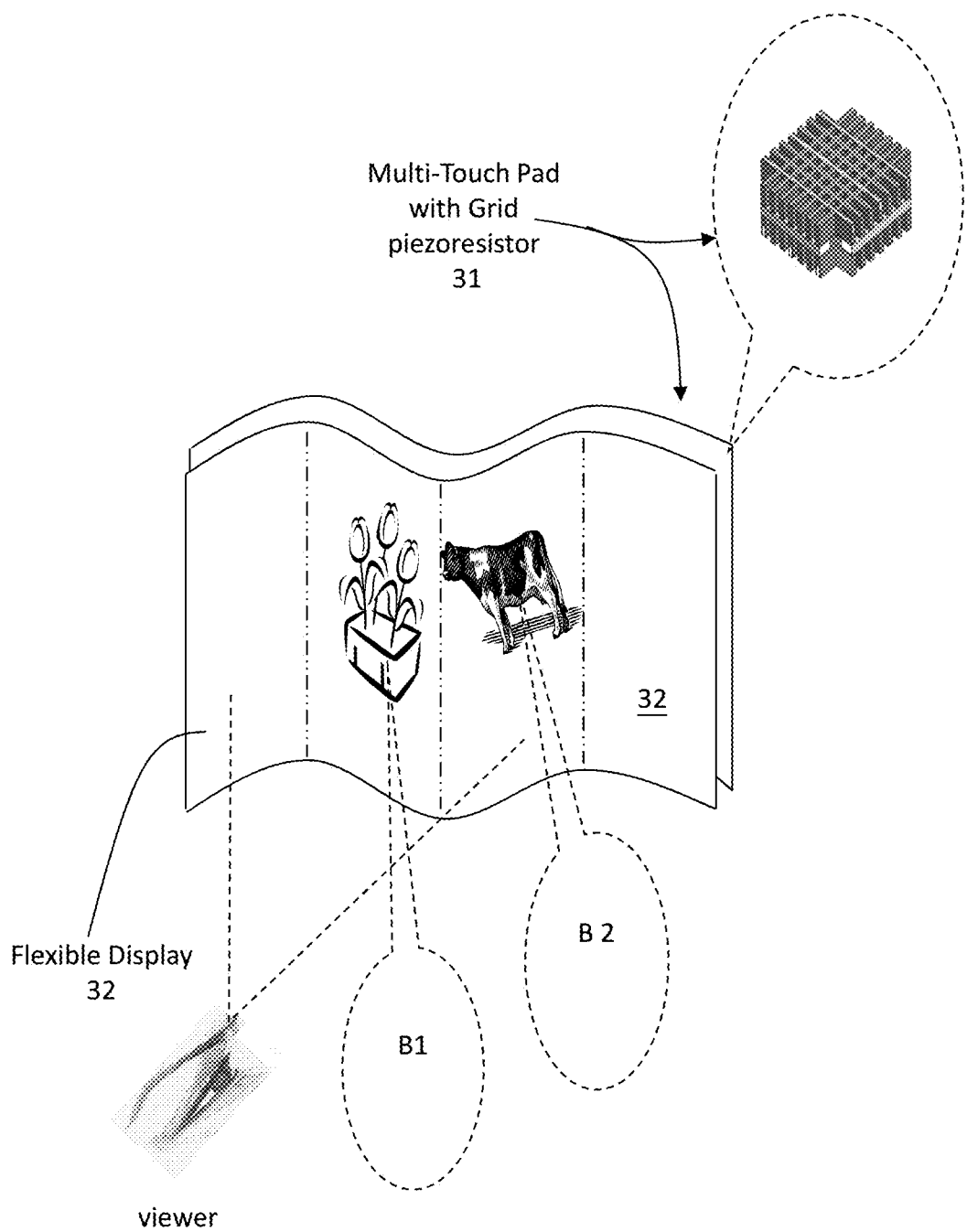
FIGS. 14~15 show a first application according to the present invention.
Figure 15:
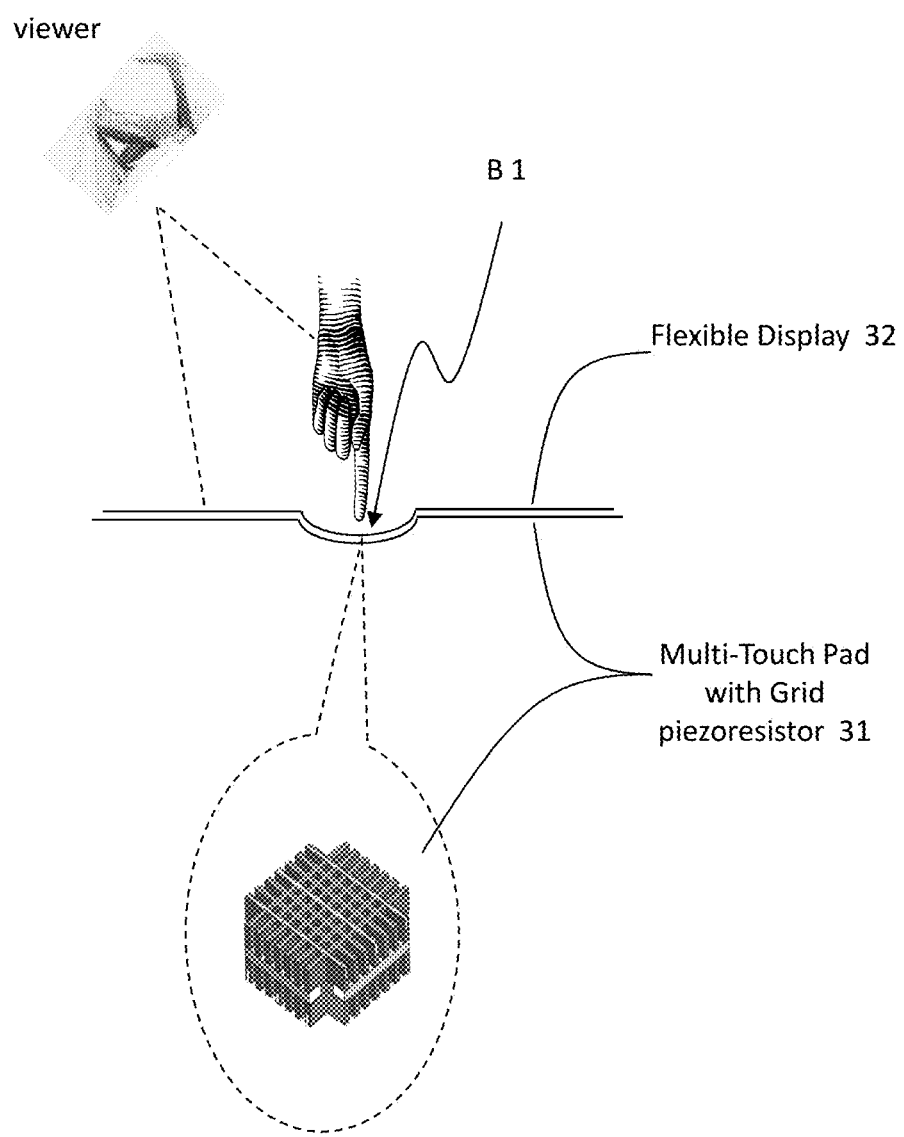

FIGS. 14~15 show a first application according to the present invention.

FIG. 14 shows that the present invention, multi-touch pad 31, can be configured on a backside of a flexible display 32. FIG. 14 shows that a display 32 shows, for example, an icon flower as a first button B1 which is depressible, and an icon cow as a second button B2 which is also depressible. When either button B1 or B2 displayed on the flexible display 32 is depressed, the pressure transmits to the underlain multi-touch pad 31 due to the flexibility of the flexible display 32. A force sensing area corresponding to the button configured on the multi-touch pad 31 senses the pressure and then a corresponding signal is sent to a control unit (not shown).

FIG. 15 shows a section view of partial area of FIG. 14.

FIG. 15 shows the flexible display 32 facing viewer for displaying information. The depressed pressure on the button B1 transmits to the underlain multi-touch pad 31. The bottom configured multi-touch pad 31 senses the button pressure of B1 and a corresponding signal is sent to a control unit (not shown).

Figure 16:
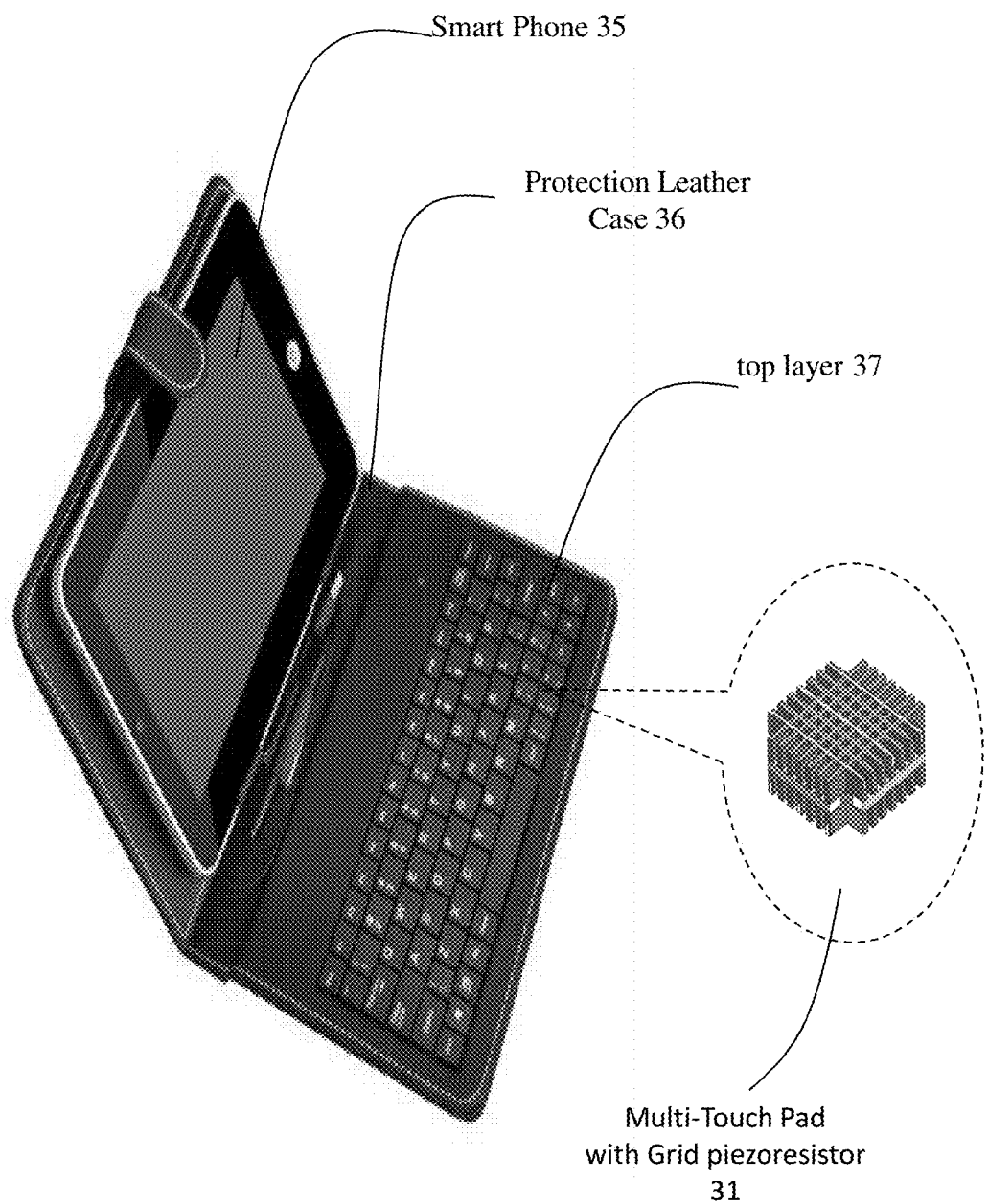
FIG. 16 shows a second application according to the present invention.

FIG. 16 shows a second application according to the present invention.

FIG. 16 shows that the present invention is configured to be an extended keyboard for a touch screen of a smart phone 35. FIG. 16 show a top layer 37 having a plurality of button; a multi-touch pad 31 is configured under the top layer 37; a force sensing area corresponding to each button is configured on the multi-touch pad 31. The multi-touch pad 31 senses a pressure and a corresponding signal is sent to a control unit when one of the buttons is depressed.

FIGS. 17 and 18A~18C show a fourth embodiment according to the present invention.

Figure 17:
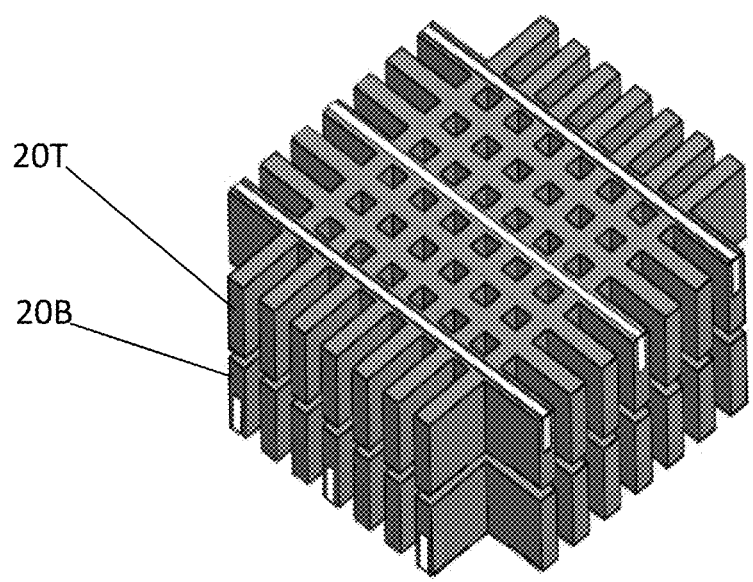
FIGS. 17 and 18A~18C show a fourth embodiment according to the present invention.

FIG. 17 shows a fourth embodiment according to the present invention.

As compared to the third embodiment of FIG. 10, the difference is that the fourth embodiment of FIG. 17 does not have a spacer in between the top grid piezoresistor 20T and the bottom grid piezoresistor 20B. The top grid piezoresistor 20T is directly stacked on the top of the bottom grid piezoresistor 20B. Though the slight contact between the two grid piezoresistors may cause a little current leakage between the top electrode and the bottom electrode, it can be regarded as circuit open through threshold current setting in the control unit. All the modifications applied to the third embodiment can also be applied to the fourth embodiment.

Figure 18A:
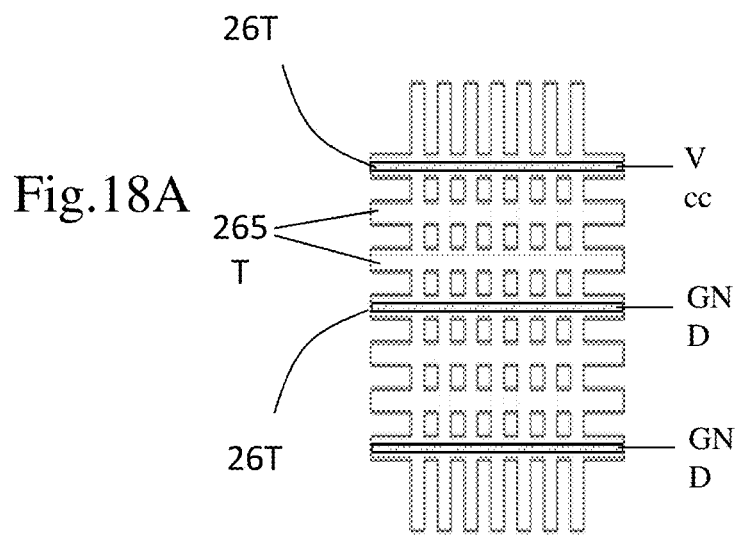

FIG. 18A shows that the top grid piezoresistor 20T is the same as that of the third embodiment of FIG. 11A.

Figure 18B:
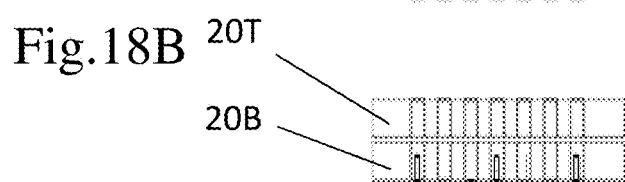

FIG. 18B shows an elevation view of the fourth embodiment. The top grid piezoresistor 20T stack on the top of the bottom grid piezoresistor 20B directly with having any spacer configured in between.

Figure 18C:
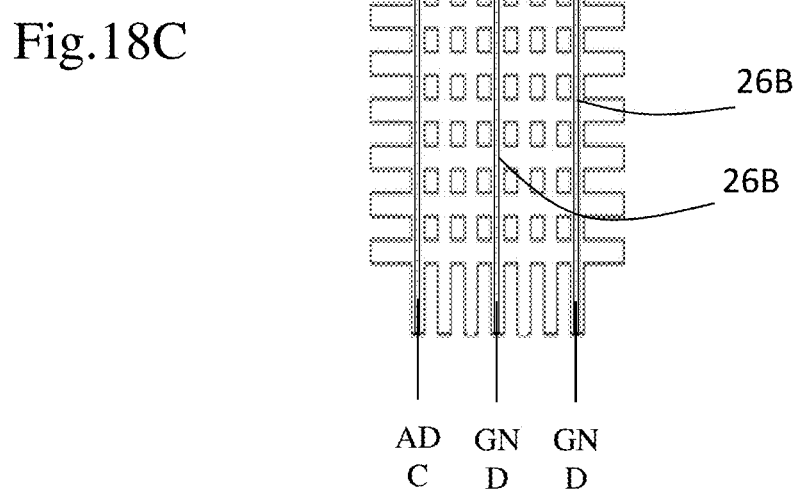

FIG. 18C shows that the bottom grid piezoresistor 20B is the same as that of the third embodiment of FIG. 11C.

Figure 19:
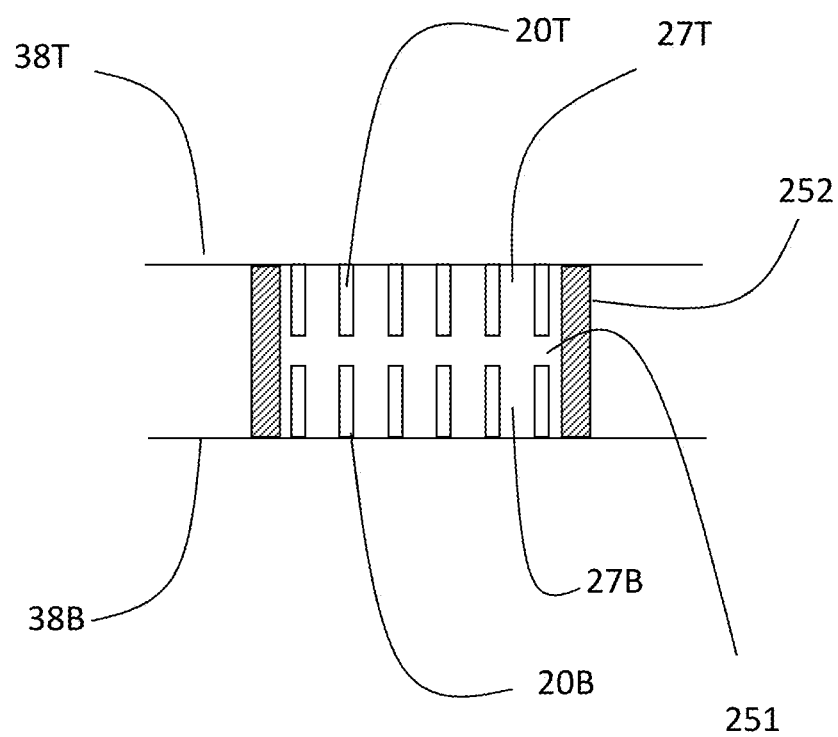
FIG. 19 shows a modified stack of the present invention.

FIG. 19 shows a modified stack of the present invention.

FIG. 19 shows that the spacer 252 is configured in between top protection layer 38T and bottom protection layer 38B. The top grid piezoresistor 20T is attached on a bottom of the top protection layer 38T and the bottom grid piezoresistor 20B is attached on a top of the bottom protection layer 38B. A space 251 is configured between the top grid piezoresistor 20T and the bottom grid piezoresistor 20B.

Figure 20:
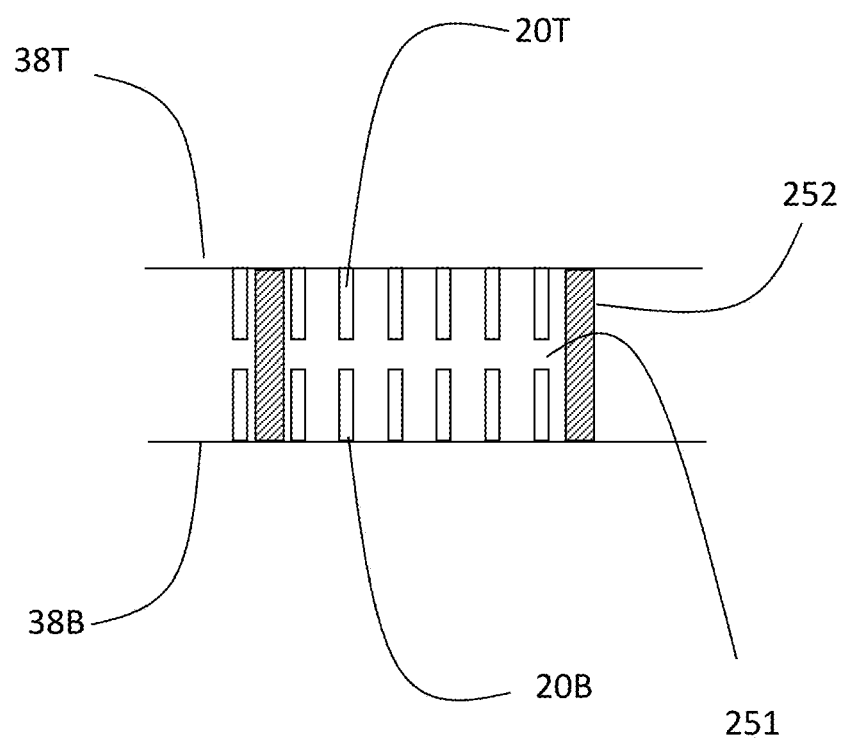
FIG. 20 shows a further modified stack of the present invention.

FIG. 20 shows a further modified stack of the present invention.

FIG. 20 shows that the spacer 252 is configured within one of the grid hole 27T, 27B in between top protection layer 38T.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. A multi-touch pad, comprising:
   a top grid piezoresistor having a plurality of top latitudinal strips and a plurality of top longitudinal strips; and
   a bottom grid piezoresistor having a plurality of bottom latitudinal strips and a plurality of bottom longitudinal strips, the top grid piezoresistor arranged on a top of the bottom grid piezoresistor.

2. A multi-touch pad as claimed in claim 1, further comprising:
   a first latitudinal electrode configured on a top of a first top latitudinal strip among the plurality of top latitudinal strips;
   a second latitudinal electrode configured on a top of a second top latitudinal strip among the plurality of top latitudinal strips;
   a first longitudinal electrode configured on a bottom of a first bottom longitudinal strip among the plurality of bottom longitudinal strips; and
   a second longitudinal electrode configured on a bottom of a second bottom longitudinal strip among the plurality of bottom longitudinal strips.

3. A multi-touch pad as claimed in claim 2, wherein the second latitudinal electrode is spaced apart from the first latitudinal electrode with at least one top latitudinal strip configured in between.

4. A multi-touch pad as claimed in claim 2, wherein the second longitudinal electrode is spaced apart from the first longitudinal electrode with at least one bottom longitudinal strip configured in between.

5. A multi-touch pad as claimed in claim 2, wherein
   one of the latitudinal electrodes is electrically coupled to Vcc; and
   one of the longitudinal electrodes is electrically coupled to ADC.

6. A multi-touch pad as claimed in claim 3, wherein
   one of the latitudinal electrodes is electrically coupled to Vcc; and
   one of the longitudinal electrodes is electrically coupled to ADC.

7. A multi-touch pad as claimed in claim 4, wherein
   one of the latitudinal electrodes is electrically coupled to Vcc; and
   one of the longitudinal electrodes is electrically coupled to ADC.

8. A multi-touch pad as claimed in claim 3, further comprising:
   a conductivity enhancing metal (CEM) configured on a top of the at least one top latitudinal strip between neighboring latitudinal electrodes.

9. A multi-touch pad as claimed in claim 4, further comprising:
   a conductivity enhancing metal (CEM) configured on a bottom of the at least one bottom longitudinal strip between neighboring longitudinal electrodes.

10. A multi-touch pad as claimed in claim 1, further comprising:
    a top protection layer configured on a top of the top grid piezoresistor; and
    a bottom protection layer configured on a bottom of the bottom grid piezoresistor.

11. A multi-touch pad as claimed in claim 10, further comprising:
a spacer configured between the top protection layer and the bottom protection layer for maintaining a space between the top grid piezoresistor and the bottom grid piezoresistor.

12. A multi-touch pad as claimed in claim 11, wherein
the top grid piezoresistor includes top grid holes defined between adjacent top latitudinal strips and between adjacent top longitudinal strips,
the bottom grid piezoresistor includes bottom grid holes defined between adjacent bottom latitudinal strips and between adjacent bottom longitudinal strips, and
the spacer is configured within one of the top grid holes and one of the bottom grid holes.

13. A flexible display, comprising:
a touch screen; and
a multi-touch pad as claimed in claim 1, the multi-touch pad configured behind the touch screen;
wherein the multi-touch pad defines a force sensing area for sensing a pressure and sending a corresponding signal to a control unit when the touch screen is pressed.

14. An extended keyboard for a touch screen device, the extended keyboard comprising:
a top layer having at least a button; and
a multi-touch pad as claimed in claim 1, the multi-touch pad configured on a bottom of the top layer;
wherein the multi-touch pad defines a force sensing area for sensing a pressure and sending a corresponding signal to a control unit when the button is pressed.

15. A process for manufacturing a multi-touch pad as claimed in claim 1, the process comprising:
printing a top grid piezoresistor which has a plurality of top latitudinal strips and a plurality of top longitudinal strips;
printing a bottom grid piezoresistor which has a plurality of bottom latitudinal strips and a plurality of bottom longitudinal strips; and
stacking the top grid piezoresistor on a top of the bottom grid piezoresistor.

16. A process as claimed in claim 15, further comprising:
printing a plurality of latitudinal electrodes, wherein each said latitudinal electrode is configured on a top of a corresponding one top latitudinal strip among the plurality of top latitudinal strips; and
printing a plurality of longitudinal electrodes, wherein each said longitudinal electrode is configured on a bottom of a corresponding one bottom longitudinal strip among the plurality of bottom longitudinal strips.

17. A process as claimed in claim 15, wherein
in said stacking, the top grid piezoresistor and the bottom grid piezoresistor are stacked to be in contact with each other without a space between the top grid piezoresistor and the bottom grid piezoresistor.

18. A multi-touch pad as claimed in claim 1, wherein
the top grid piezoresistor and the bottom grid piezoresistor are in contact with each other without a space between the top grid piezoresistor and the bottom grid piezoresistor.

19. A multi-touch pad as claimed in claim 1, further comprising:
a spacer between the top grid piezoresistor and the bottom grid piezoresistor to maintain a space between the top grid piezoresistor and the bottom grid piezoresistor.

20. A multi-touch pad as claimed in claim 2, wherein
the second latitudinal electrode is spaced apart from the first latitudinal electrode with at least one top latitudinal strip configured in between, the at least one top latitudinal strip being free of conductive material on a top thereof, and
the second longitudinal electrode is spaced apart from the first longitudinal electrode with at least one bottom longitudinal strip configured in between, the at least one bottom longitudinal strip being free of conductive material on a bottom thereof.

* * * * *